United States Patent
Tortosa et al.

(10) Patent No.: US 11,185,781 B2
(45) Date of Patent: Nov. 30, 2021

(54) COGNITIVE USER EXPERIENCE OPTIMIZATION

(71) Applicant: INTERNATIONAL BUSINESS MACHINES CORPORATION, Armonk, NY (US)

(72) Inventors: Andrea Tortosa, Rome (IT); Nicola Milanese, Rome (IT); Matteo Rogante, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/776,608

(22) Filed: Jan. 30, 2020

(65) Prior Publication Data

US 2020/0164275 A1 May 28, 2020

Related U.S. Application Data

(63) Continuation of application No. 15/813,484, filed on Nov. 15, 2017, now Pat. No. 10,632,387.

(51) Int. Cl.
| | | |
|---|---|---|
| A63F 13/67 | (2014.01) | |
| A63F 13/55 | (2014.01) | |
| A63F 13/30 | (2014.01) | |
| A63F 13/798 | (2014.01) | |
| A63F 13/33 | (2014.01) | |
| A63F 13/79 | (2014.01) | |

(52) U.S. Cl.
CPC .............. *A63F 13/67* (2014.09); *A63F 13/30* (2014.09); *A63F 13/33* (2014.09); *A63F 13/55* (2014.09); *A63F 13/79* (2014.09); *A63F 13/798* (2014.09); *A63F 2300/558* (2013.01); *A63F 2300/6027* (2013.01)

(58) Field of Classification Search
CPC .. A63F 13/67; A63F 13/798; A63F 2300/558; A63F 2300/6027
See application file for complete search history.

(56) References Cited

U.S. PATENT DOCUMENTS

| 8,221,221 | B2 | 7/2012 | Riego | |
| 9,498,704 | B1* | 11/2016 | Cohen | ..................... H04L 67/38 |
| 2002/0103429 | A1 | 8/2002 | deCharms | |
| 2007/0066403 | A1 | 3/2007 | Conkwright | |

(Continued)

FOREIGN PATENT DOCUMENTS

WO  2017040167 A1  3/2017

OTHER PUBLICATIONS

List of IBM Patents or Applications Treated as Related, Jan. 30, 2020, 2 pgs.

(Continued)

*Primary Examiner* — Steven J Hylinski
(74) *Attorney, Agent, or Firm* — Aaron Pontikos; Hye Jin Lucy Song; Heslin Rothenberg Farley & Mesiti PC (57) ABSTRACT

Optimization of user experience in an interactive environment is disclosed. User experience input is generated by a user during a session of interaction. A user perception on an interaction is determined based on analyzing the user experience input by use of a cognitive model of user perception. For a negative user perception, one or more difficulty of respective items in the interaction is adjusted to match a skill level of the user.

20 Claims, 6 Drawing Sheets

(56) References Cited

U.S. PATENT DOCUMENTS

| | | |
|---|---|---|
| 2008/0096643 A1 | 4/2008 | Venkatesh et al. |
| 2010/0240458 A1 | 9/2010 | Gaiba et al. |
| 2011/0009193 A1 | 1/2011 | Bond et al. |
| 2011/0231349 A1 | 9/2011 | Stacy et al. |
| 2012/0046569 A1 | 2/2012 | Johnstone et al. |
| 2012/0064499 A1 | 3/2012 | Samuelson et al. |
| 2012/0258436 A1 | 10/2012 | Lee |
| 2013/0159228 A1 | 6/2013 | Meijer et al. |
| 2013/0225260 A1 | 8/2013 | Cudak et al. |
| 2017/0080339 A1 | 3/2017 | Bond et al. |
| 2017/0259177 A1* | 9/2017 | Aghdaie ............... A63F 13/35 |
| 2018/0189398 A1 | 7/2018 | Sternberg et al. |
| 2018/0286272 A1 | 10/2018 | McDermott et al. |
| 2019/0143216 A1 | 5/2019 | Tortosa et al. |

OTHER PUBLICATIONS

Baldwin, A., et al., "Crowd-Pleaser: Player Perspectives of Multiplayer Dynamic Difficulty Adjustment in Video Games", ACM CHI Play '16, Oct. 16-19, 2016, Austin, TX, USA, pp. 326-337.

Mell, Peter, et al., "The NIST Definition of Cloud Computing", NIST Special Publication 800-145, Sep. 2011, Gaithersburg, MD, 7 pgs.

\* cited by examiner

FIG. 6 ing user experience optimizing user experience
COGNITIVE USER EXPERIENCE OPTIMIZATION

TECHNICAL FIELD

The present disclosure relates to cognitive technology, and more particularly to methods, computer program products, and systems for optimizing user experience in online games.

BACKGROUND

Conventional online games have respective target age group and target skill levels as in non-interactive entertainment products. Once users select one of the conventional online games, all users play the same game over a period of time. Various factors determining user experience with online games may include, but are not limited to, individual skill levels of users, types and challenges of the online games, respective learning curves of the users, and how well certain factors align.

SUMMARY

The shortcomings of the prior art are overcome, and additional advantages are provided, through the provision, in one aspect, of a method. The method includes, for instance: obtaining, by one or more processor, a user experience input as being generated by a user during a session of an interaction, where an interactive environment services the interaction; determining a user perception on the interaction based on analyzing the user experience input by use of a cognitive model of user perception; ascertaining that the user perception is negative on the interaction; and adjusting one or more difficulty of respective items in the interaction to match a skill level of the user, the adjusting includes: identifying an item from the respective items in the interaction, where the item is associated with the user experience input that leads to the negative user perception of the interaction in the ascertaining.

The method for optimizing user experience in an interactive environment includes, for instance: obtaining, by one or more processor, user experience input as being generated by a user during a session of interaction, wherein the interactive environment services the interaction; determining a user perception on the interaction based on analyzing the user experience input by use of a cognitive model of user perception; ascertaining that the user perception is negative on the interaction; and adjusting one or more difficulty of respective items in the interaction corresponding to a skill level of the user.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
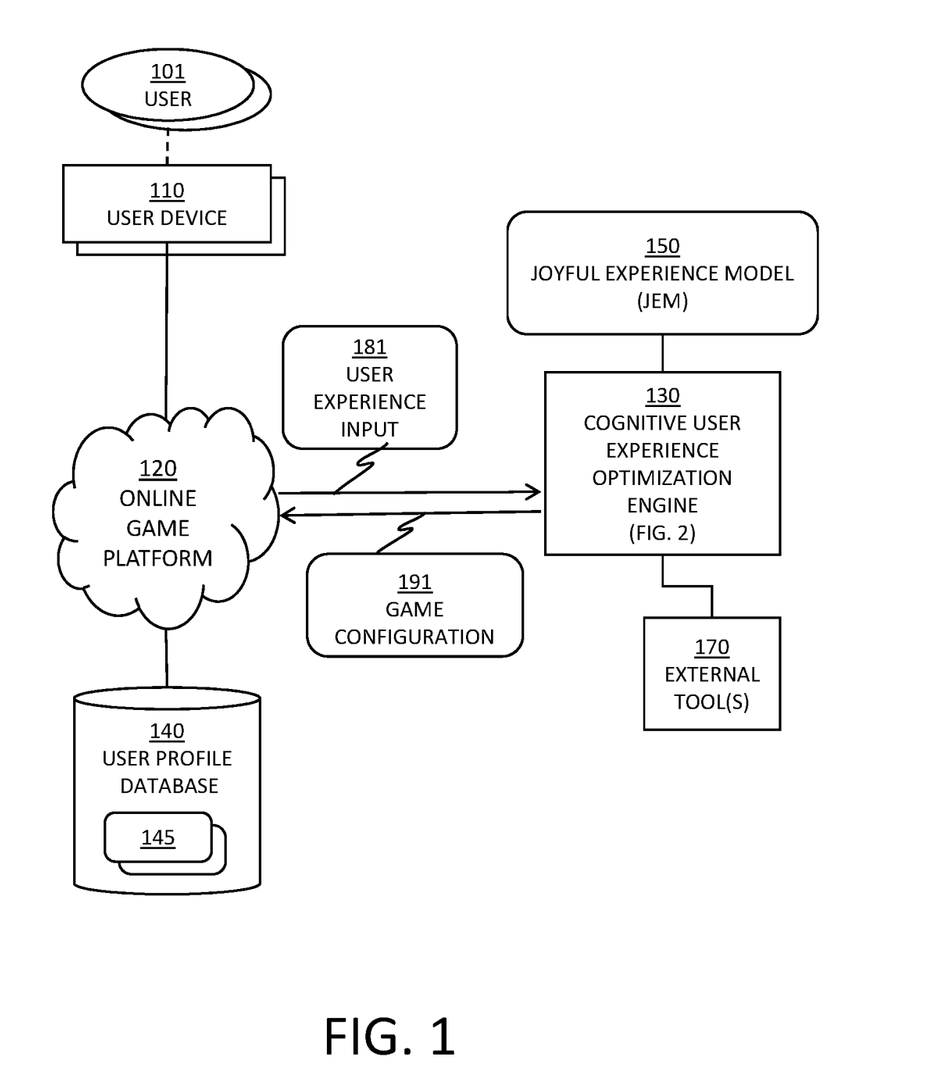
FIG. 1 depicts a system for optimizing user experience with online games, in accordance with one or more embodiments set forth herein.

FIG. 1 depicts a system 100 for optimizing user experience with online games, in accordance with one or more embodiments set forth herein.

Embodiments of the present invention recognize that users may not enjoy their games because the users do not have respective skill levels corresponding to the challenges of the online games. Because individual skill levels of users in playing games or any other skill-based interaction are initially different and would evolve differently, dynamic adaptation to skill levels of users would greatly benefit providers of such interactions as well as enjoyment of the users performing the interactions.

The system 100 includes a cognitive user experience optimization engine 130 which provides an experience optimization service for an online game platform 120. A user 101 of the online game platform 120, by use of one or more user device 110, accesses the online game platform 120 and plays one or more games on the online game platform 120.

The online game platform 120 offers a variety of computer games to a plurality of users, including the user 101 subscribed for the user experience optimization service. The online game platform 120 may offer limited accesses to other types of users who has not subscribed to the experience optimization service for reasons such as promotional trial, user data gathering. All users accessing the online game platform 120 have respective user profiles. The online game platform 102 stores the user profiles in a user profile database 140. The online game platform 102 creates a user profile 145 for the user 101 upon registration with the online game platform 120. The user profile 145 includes user identifier such as user name, gender, and age, for the purpose of the experience optimization service.

The online game platform 102 sends a user experience input 181 to the cognitive user experience optimization engine 130 while the user 101 plays a game. The user experience input 181 includes the user profile 145, game activity data, and user feedbacks. Examples of the game activity data may be, but are not limited to, a current level in the game, a time period of the game session, time periods to complete respective observation units from the game, time periods taken to complete respective levels in the game, numbers of attempts until to pass respective challenges, types of skills applied by the user, an assessed skill level of the user, points of failure per observation unit period of time, and points of success per observation unit period of time.

The online game platform 102 may receive a game configuration 191 responsive to the user experience input 181, as generated by the cognitive user experience optimization engine 130 if the user 101 does not have optimal experience with the game. The online game platform 120 executes the game according to the game configuration 191 received. The game configuration 191 may include a set of values for controlling difficulty features in the game such as respective speeds of various game components, respective angles of turns, respective attributes, sizes, and numbers of obstacles and/or challenges. The game configuration 191 may collectively make the game easier for the user 101 when the user 101 struggles with making progresses, and also may make the game more challenging for the user 101 when the user 101 plays the game proficiently and may benefit from more challenges in the game. Further, the online game platform 102 may facilitate multiple granularities of control for individual aspect of the obstacles and challenges, and accordingly, may adjust difficulty levels of the game minutely and continuously in order to avoid noticeable changes in difficulty levels associated with the respective obstacles and/or challenges.

Prior to service the user 101, the cognitive user experience optimization engine 130 builds and trains a Joyful Experience Model (JEM) 150 based on multiple user experience inputs received from the online game platform 120. The user experience inputs include user profiles, game activities during each session, and user feedback on game experiences, respectively for each user during the training. The Joyful Experience Model (JEM) 150 is formulated to determine how users perceive a certain game sessions based on numerous aspects of each user experience input. The cognitive user experience optimization engine 130 trains the JEM 150 with a certain number of training data instances before servicing the user 101. The number of training data instance may be predefined for statistically meaningful determinations on user experience.

Upon the JEM 150 becoming usable for the experience optimization service, the cognitive user experience optimization engine 130 services the user 101. Because the JEM 150 has been previously built and trained and the JEM 150 is applicable across various games and users, the online game platform 120 may provide, by using the cognitive user experience optimization engine 130, the experience optimization service on any game to any user, even if the user 101 is a new subscriber of the online game platform 120 who is playing a game in the online game platform 120 for the first time. The user experience input 181 associated with the user 101 has similar data elements as in the training of the JEM 150, including the user profile 145, game activities during a current session, and a direct feedback from the user 101 on game experiences such as reviews, rankings, game chatting messages. The cognitive user experience optimization engine 130 determines if the user 101 is enjoying the game based on running the user experience input 181 against the JEM 150. The cognitive user experience optimization engine 130 then generates a game configuration 191 that is more enjoyable for the user 101, upon determining that the user 101 is not enjoying the game session.

The cognitive user experience optimization engine 130 may utilize one or more external tool 170 such as cognitive computing resources, and statistics tools. In certain embodiments of the present invention, if the user 101 has previously consented, user feedback may be collected by audio/visual recognition devices and processing on the audio/visual data, by use of respective external tools 170.

In certain embodiments of the present invention the Joyful Experience Model (JEM) 150 may be applied to online platforms for interactive service applications other than games such as online classrooms. With such interactive service applications, the quality of experience may be determined based on difficulty levels of service content, differentiated learning curves, and skill levels of individual users, as in the online game platform 120.

Figure 2:
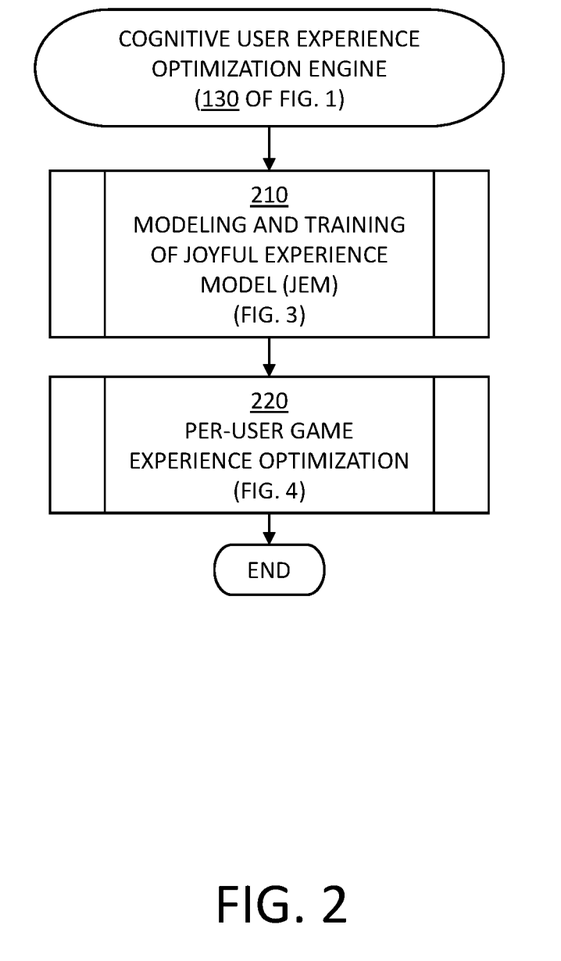
FIG. 2 depicts a flowchart of operations performed by the cognitive user experience optimization engine, in accordance with one or more embodiments set forth herein.
Figure 3:
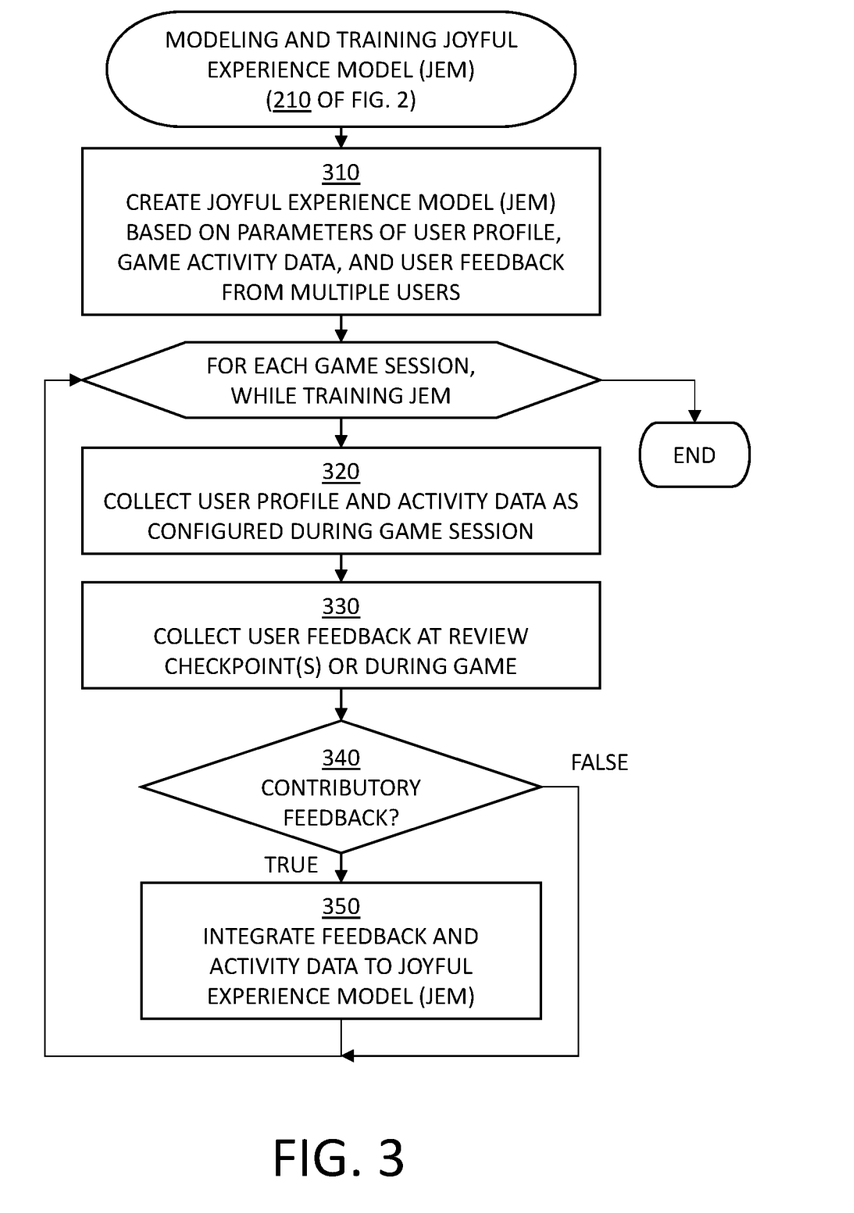
FIG. 3 depicts a flowchart of modeling and training the Joyful Experience Model (JEM), in accordance with one or more embodiments set forth herein.
Figure 4:
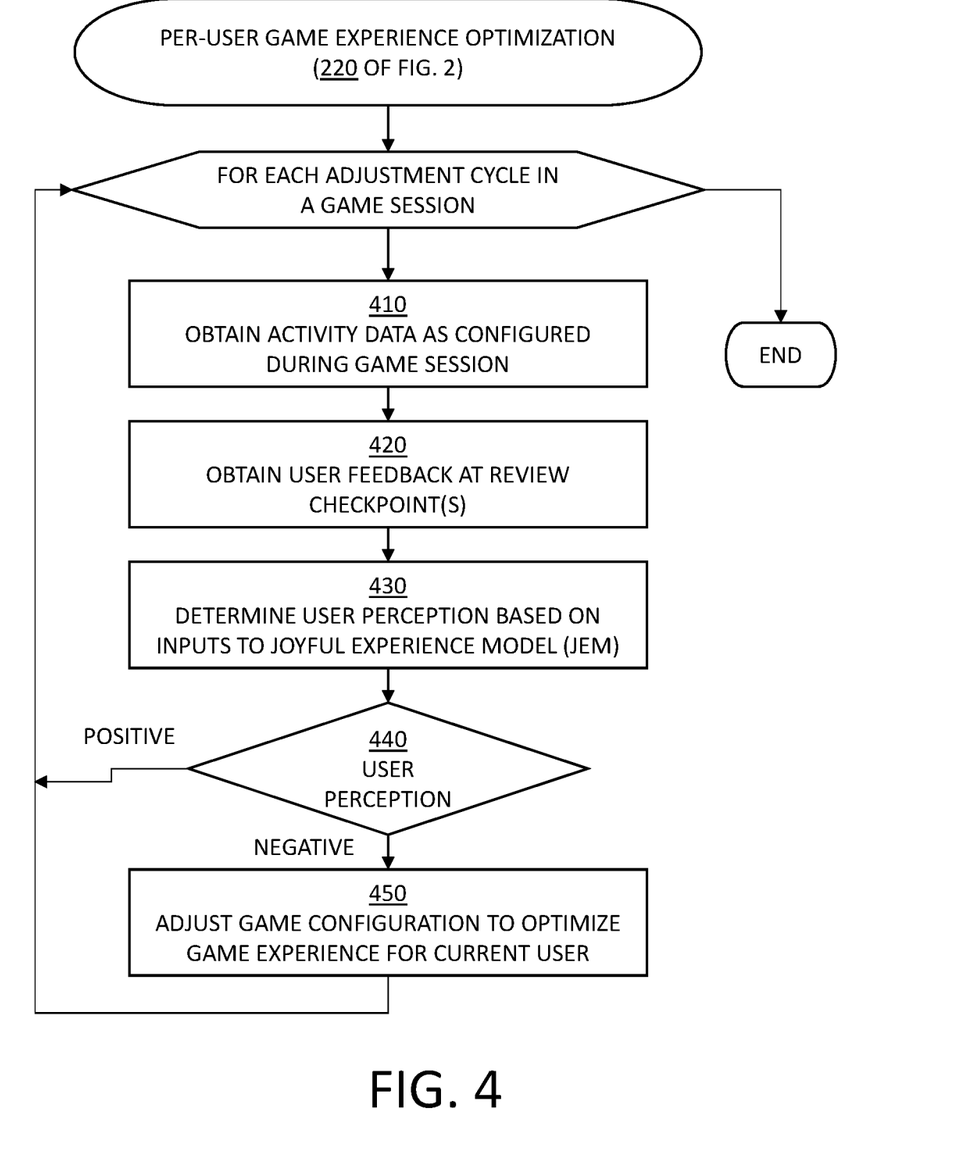
FIG. 4 depicts a flowchart of providing the experience optimization service to an individual user, in accordance with one or more embodiments set forth herein.

Detailed operations of the cognitive user experience optimization engine 130 are presented in FIGS. 2, 3, and 4, and corresponding description. Certain embodiments of the present invention may be employed as a service of a conventional cognitive computing platform such as IBM Watson or of a commercially available cloud computing system such as IBM Bluemix. (IBM Watson and Bluemix are registered trademarks of International Business Machines Corporation in the United States and other countries)

FIG. 2 depicts a flowchart of operations performed by the cognitive user experience optimization engine 130 of FIG. 1, in accordance with one or more embodiments set forth herein.

In block 210, the cognitive user experience optimization engine 130 indicates a model preparation phase in which the cognitive user experience optimization engine 130 creates the Joyful Experience Model (JEM) and trains the JEM with multiple game sessions by many users. Detailed operations of block 210 are presented in FIG. 3 and corresponding description. Then the cognitive user experience optimization engine 130 proceeds with block 220.

The cognitive user experience optimization engine 130 trains the JEM with multiple instances of game data as collected from many users. The game data is a set of data similar to the user experience input 181, which includes user profiles, game activities data gathered during each session, and user feedback on game experiences, respectively for each user during the training.

In block 220, the cognitive user experience optimization engine 130 indicates an operational phase in which the cognitive user experience optimization engine 130 services users with the experience optimization service by using the Joyful Experience Model (JEM) trained in block 210 above. In certain embodiments of the present invention, the cognitive user experience optimization engine 130 may be implemented by using a commercially available cognitive computing platform. Detailed operations of block 220 are presented in FIG. 4 and corresponding description. Then the cognitive user experience optimization engine 130 terminates processing. In certain embodiments of the present invention, block 220 may be performed concurrently and iteratively for all users subject to the experience optimization service.

FIG. 3 depicts a flowchart of modeling and training the Joyful Experience Model (JEM) as performed in block 210 of FIG. 2, in accordance with one or more embodiments set forth herein.

In block 310, the cognitive user experience optimization engine 130 creates the Joyful Experience Model (JEM) based on parameters of user profiles, gaming activity data, and user feedbacks from multiple users. A default game difficulty for a user may be initially determined based on an average skill level of the age and/or gender group as shown in a user profile of the user. The cognitive user experience optimization engine 130 obtains the parameters for building the JEM from the user experience input 181 during training runs of the JEM, in order to provide experience optimization services to individual users, as described in FIG. 4 and corresponding description. Then the cognitive user experience optimization engine 130 proceeds with block 320.

The user profiles may include, for example, data items of: user age and gender, the type of registration indicating whether or not the user is subject to the experience optimization service.

The game activities data may include various data points that would be reflected in the distributions of the Joyful Experience Model (JEM), for example, a time period of game playing session indicating how long users play the game, a time period to complete respective observation unit of the game, points of failure per observation unit period of time, points of success per observation unit period of time. The game activity data may further include, for example, a current level, a number of attempts until to pass respective challenges, types of tricks or secrets used by the user, a skill level of the user as assessed by past and/or current game activity data.

Term "observation unit" may refer to a level in a game, a group of levels, an entire game, and/or a game session. The "points of failure" indicates obstacles in a game where a user fails more than once. The "points of success" indicates maneuvers a user successfully applied to overcome respective obstacles in a game.

The Joyful Experience Model (JEM) is a collection of statistical distributions of respective user experience inputs that indicate that average users are enjoying the game, as determined by user feedback corresponding to the game activity data represented in the user experience inputs. The relation between user experience inputs and the statistical distributions of enjoyment may be generally applied to other games, particularly for a similar type of games to a game for which training data has been sampled. For example, if 85% of users logged a game playing session longer than 30 minutes gave a positive review that they are enjoying the game, then the JEM records the association, along with the individual data points. Later the cognitive user experience optimization engine 130 may determine that another user playing the game for a similar duration as enjoying the game with approximately 85% confidence level, by using the JEM. For another example, if the JEM includes another statistical distribution describing 70% of users who exit a game after a point of failure gave a negative review that the obstacle is too difficult, then the cognitive user experience optimization engine 130 may determine, based on the distribution of the JEM, that another user displaying similar behavior, exiting after repeated failures on a particular obstacle, as being frustrated and less skilled than necessary to pass the point of failure such as a big jump at a snowboarding game, or a sharp turn at a driving game. For another example, if the user used a secret trick that is known only to 3% of expert users, in order to advance with an obstacle, then the cognitive user experience optimization engine 130 may determine that the skill level of the user is very high.

The cognitive user experience optimization engine 130 may also create an individual experience model per user based on past activities on the online game platform by respective users. The individual experience model may include, types of games the subject user plays and preference levels for respective types of the games. Examples of game types may include, but are not limited to, logical puzzles, shooter actions, and arcade games. The cognitive user experience optimization engine 130 may utilize the individual experience model in conjunction with a fully trained JEM for individual experience optimization service.

The cognitive user experience optimization engine 130 performs blocks 320, 330, 340, and 350 as a unit for each game session of a user. As noted, the JEM is trained by user experience inputs from multiple users, up to a preconfigured number of samples that a meaningful decision could be made based on the distributions of the JEM.

In block 320, the cognitive user experience optimization engine 130 collects user profile for a current user and game activity data as configured during a current game session by a current user. The user profile, as noted, includes age and gender of the current user. As noted, game activity data may include, for example, a current level in the game, a time period of the game session, time periods to complete respective observation units from the game, time periods taken to complete respective levels in the game, numbers of attempts until to pass respective challenges, types of skills applied by the user, an assessed skill level of the user, points of failure per observation unit period of time, and points of success per observation unit period of time. The cognitive user experience optimization engine 130 correlates user profile data with the game activity data as gathering data. Then the cognitive user experience optimization engine 130 proceeds with block 330.

In block 330, the cognitive user experience optimization engine 130 collects user feedback at one or more review checkpoint. The user feedback may be a ranking such as a five-star scale, a text review, and/or a message and/or script from game chatting. The cognitive user experience optimization engine 130 may iterate blocks 320 and 330 during the game session and gather multiple user feedback. As in game chatting message, the cognitive user experience optimization engine 130 may be obtained concurrently with the game. The cognitive user experience optimization engine 130 proceeds with block 340 upon conclusion of the game session.

In block 340, the cognitive user experience optimization engine 130 determines whether or not the user feedback(s) collected in block 330 is contributory to the Joyful Experience Model (JEM), indicating that the game activity data associated with the user feedback may be reflected in distributions of the JEM as being joyful, or otherwise positive. If the cognitive user experience optimization engine 130 determines that the user feedback is contributory to the JEM, then the cognitive user experience optimization engine 130 proceeds with block 350. If the cognitive user experience optimization engine 130 determines that the user feedback does not contribute to the JEM, then the cognitive user experience optimization engine 130 discard the associated user experience input and loops back to block 320.

In block 350, the cognitive user experience optimization engine 130 integrates the user feedback and the correlated game activity data to respective distributions in the Joyful Experience Model (JEM). For example, if the user who played the game over 30 minutes gave a positive review that they are enjoying the game, then a data point of the game session length equal to 30 minutes is added into the game session length—joyful experience distribution in the JEM records the association. Then the cognitive user experience optimization engine 130 loops back to block 320 for another game session corresponding to another user.

FIG. 4 depicts a flowchart of providing the experience optimization service to an individual user as performed in block 220 of FIG. 2, in accordance with one or more embodiments set forth herein.

The cognitive user experience optimization engine 130 performs blocks 410, 420, 430, 440, and 450 as a single adjustment cycle during a game session by a user subscribed for the experience optimization service. An adjustment cycle may be a fixed interval, or any other frequency as stipulated in the service agreement. The cognitive user experience optimization engine 130 may concurrently perform multiple instances of the adjustment cycle, blocks 410 through 450, for each user subscribed for the experience optimization service In block 410, the cognitive user experience optimization engine 130 obtains game activity data as configured during a game session by the user. Then the cognitive user experience optimization engine 130 proceeds with block 420.

In block 420, the cognitive user experience optimization engine 130 obtains zero or more user feedback at respective review checkpoints. Then the cognitive user experience optimization engine 130 proceeds with block 430.

In block 430, the cognitive user experience optimization engine 130 determines user perception of the game at a current adjustment cycle based on the inputs obtained from blocks 410 and 420, using the Joyful Experience Model (JEM). If the game activity data from inputs are positioned within the distributions of the JEM, then the cognitive user experience optimization engine 130 determines that the user is having a pleasurable experience. If the game activity data in the inputs are aberrant with respect to the distributions of the JEM, then the cognitive user experience optimization engine 130 determines that the user is not having a good experience. Further, based on respective positions of the game activity data points corresponding to the inputs relative to the JEM distribution, the cognitive user experience optimization engine 130 may determine if the inputs indicate either a frustration caused by difficult challenges or a boredom caused by little to no challenges in the game. For example, if the user takes less than half the time of average users in the distribution to finish a level, then the cognitive user experience optimization engine 130 determines that the user is not challenged enough. In contrast, if the user takes twice as long as the time of average users in the distribution to finish a level, then the cognitive user experience optimization engine 130 determines that the user is frustrated with the game difficulty of the level. The threshold values for upper and lower limits may be preconfigured, or may be dynamically set to a mean value of the training data in the respective distributions of the JEM. Then the cognitive user experience optimization engine 130 proceeds with block 440.

In block 440, the cognitive user experience optimization engine 130 proceeds with block 450 if the user perception determined from block 430 indicates that the user perception is negative, either frustrated or bored. If the user perception determined from block 430 indicates that the user perception is positive, then the cognitive user experience optimization engine 130 loops back to block 410 for next adjustment cycle for another user.

In block 450, the cognitive user experience optimization engine 130 adjusts game configuration to optimize game experience for the current user. The game configuration, particularly values for variables controlling difficulties of respective obstacles and challenges may be either increased or decreased. The cognitive user experience optimization engine 130 makes the game more difficult if the user perception is on the bored side. The cognitive user experience optimization engine 130 makes the game more difficult if the user perception represents that the user is not challenged enough. The cognitive user experience optimization engine 130 makes the game less difficult if the user perception represents that the user is struggling. Then the cognitive user experience optimization engine 130 loops back to block 410 for next adjustment cycle of the current user during a game session.

Certain embodiments of the present invention may offer various technical computing advantages, including: cognitive modeling and training of a cognitive model by machine learning; user perception determination based on the cognitive model; and dynamic online application configuration adjustment based on the user perception as determined. An interactive online application service such as computer games is initially configured to an average level for the age and gender group as obtained from user registration data. User perception is modeled as respective statistical distributions of the cognitive model based on activity data from multiple users and user feedbacks. Individual user perception is later determined by analyzing activity data generated by the user against the statistical distributions of the cognitive model. Certain embodiments of the present invention may be implemented by use of a cloud platform/data center in various types including a Software-as-a-Service (SaaS), Platform-as-a-Service (PaaS), Database-as-a-Service (DBaaS), and combinations thereof based on types of subscription. The user experience optimization service may be provided for subscribed individual and/or entities in need from any location in the world.

Figure 5:
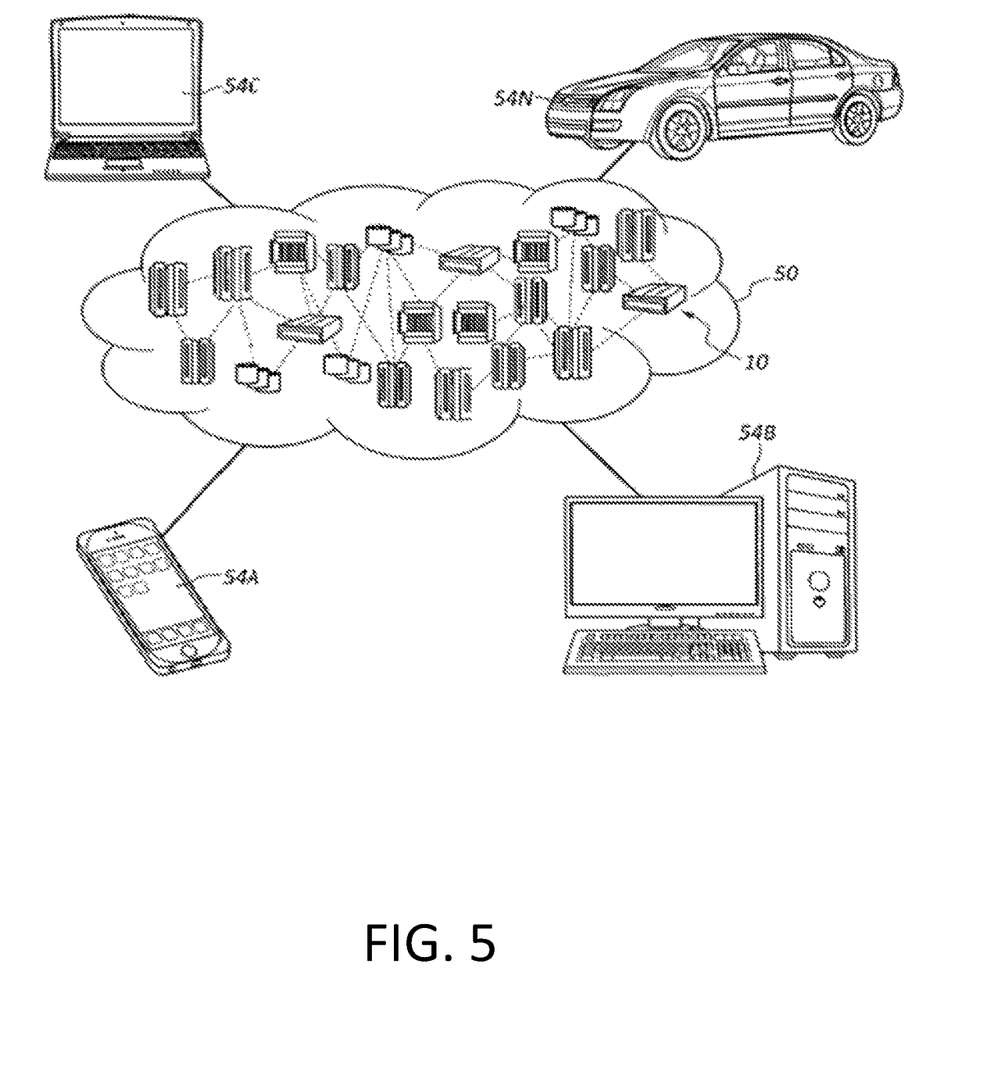
FIG. 5 depicts a cloud computing environment according to an embodiment of the present invention.
Figure 6:
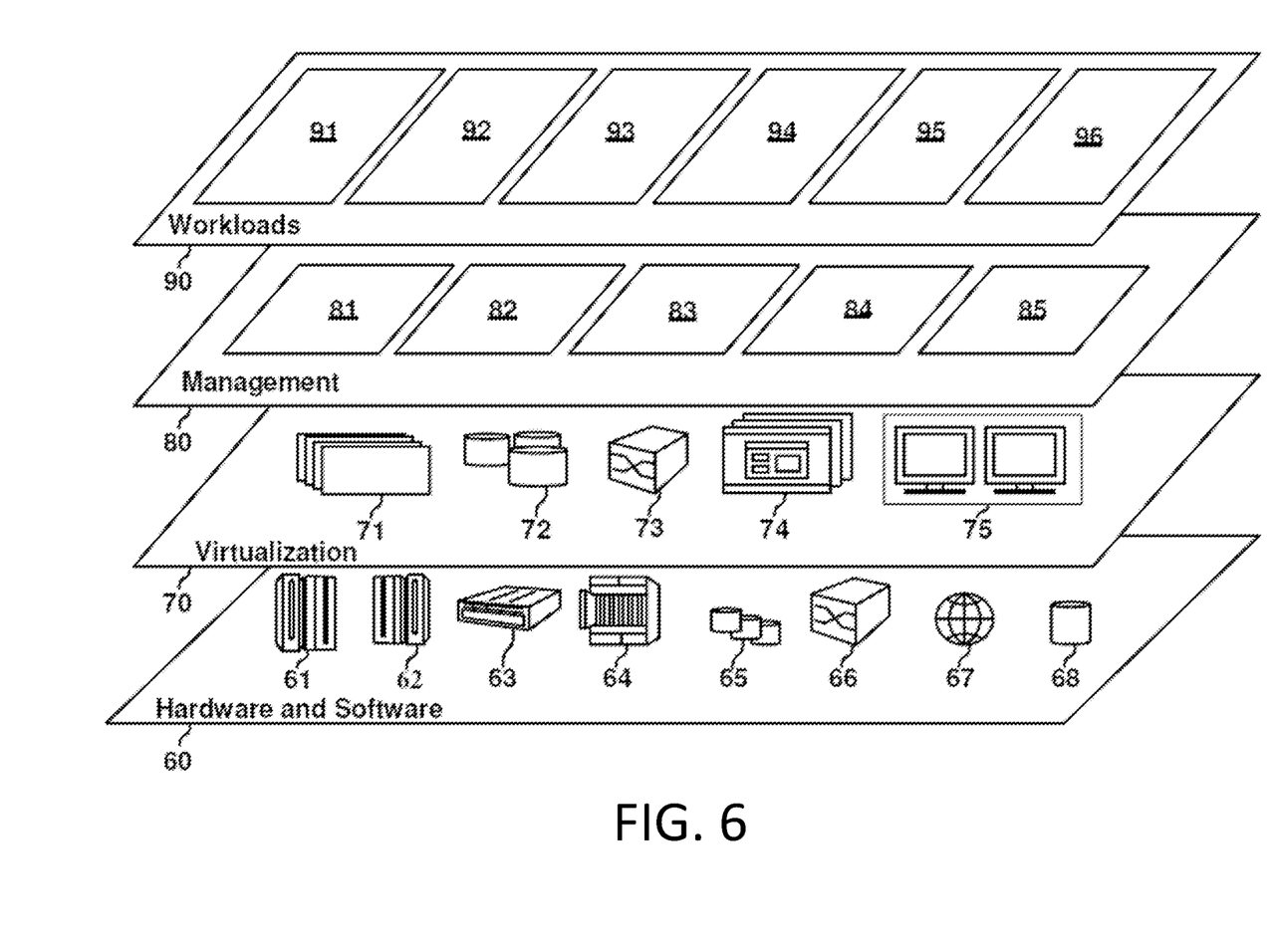
FIG. 6 depicts abstraction model layers according to an embodiment of the present invention.

FIGS. 5-6 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the cognitive user experience optimization engine 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises,"

"has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    obtaining, by one or more processor, a user experience input as being generated by a user during a session of an interaction, wherein an interactive environment services the interaction;
    determining a user perception on the interaction based on analyzing the user experience input by use of a cognitive model of user perception;
    ascertaining that the user perception is negative on the interaction based on that the user experience input fits activity data associated with a negative review in the cognitive model with respect to one or more difficulty of respective items in the interaction; and
    adjusting the one or more difficulty of the respective items in the interaction to match a skill level of the user, the adjusting comprising:
        identifying an item from the respective items in the interaction, wherein the item is associated with the user experience input that leads to the user perception of the interaction being negative in the ascertaining, wherein a difficulty of the item in the interaction is determined by aspects configuring the item in the interaction, comprising a number and a size of the item, and physical attributes on movement and behavior of the item in the interaction, and wherein the skill level of the user is determined by past and current activity data represented in the cognitive model comprising a current level in the interaction, a number of attempts by the user until completing respective items, and types of acrobatic maneuvers or secrets used by the user respective to the items.

2. The computer implemented method of claim 1, the adjusting further comprising:
    changing the difficulty of the item from the identifying in a manner that the change in the difficulty of the item is not noticeable by the user.

3. The computer implemented method of claim 1, the adjusting further comprising:
    changing, in a configuration controlling the interaction, the difficulty corresponding to the item from the identifying by a certain granularity that is not noticeable by the user toward the skill level of the user, wherein the difficulty corresponding to the item facilitates numerous levels of difficulties differing by the certain granularity.

4. The computer implemented method of claim 3, the adjusting further comprising:
    iterating the changing until the difficulty corresponding to the item matches the skill level of the user during the session of the interaction.

5. The computer implemented method of claim 1, the adjusting further comprising:
    changing, in a configuration controlling the interaction, the difficulty corresponding to the item from the identifying by a certain granularity that is not noticeable by the user toward the skill level of the user, wherein the difficulty corresponding to the item facilitates numerous levels of difficulties differing by the certain granularity; and
    iterating the changing until the difficulty corresponding to the item matches the skill level of the user during the session of the interaction.

6. The computer implemented method of claim 1, further comprising:
    building the cognitive model of user perception, the cognitive model of user perception including a collection of statistical distributions, wherein each distribution from the collection in the cognitive model of user perception represents how data points of a parameter of one or more parameters in the user experience input are related with positive user perception on the interaction.

7. The computer implemented method of claim 1, further comprising:
    building the cognitive model of user perception, the cognitive model of user perception including a collection of statistical distributions, wherein each distribution from the collection in the cognitive model of user perception represents how data points of a parameter of one or more parameters in the user experience input are related with positive user perception on the interaction, wherein the one or more parameters represented in the user experience input comprise a time period of the session, a set of time periods to complete respective observation units from the interaction, another set of time periods taken to complete respective levels in the interaction, numbers of attempts until to pass respective challenges, types of skills applied by the user, an assessed skill level of the user, points of failure per observation unit period of time, and points of success per observation unit period of time.

8. The computer implemented method of claim 1, further comprising:
    building the cognitive model of user perception, the cognitive model of user perception including a collection of statistical distributions, wherein each distribution from the collection in the cognitive model of user perception represents how data points of a parameter of one or more parameters in the user experience input are related with positive user perception on the interaction, the building comprising:
        obtaining the user experience input including user profile of the user, activity data, and one or more user feedback;
        ascertaining that the one or more user feedback is positive; and adding the data points from the activity data in respective statistical distributions in the cognitive model of user perception.

9. The computer implemented method of claim 1, the adjusting further comprising:
ascertaining that the user perception is frustration based on discovering that the difficulty corresponding to the item from the identifying is greater than the skill level of the user; and
decreasing the difficulty corresponding to the item in the interaction during the adjusting to thereby improve the user perception on the interaction.

10. The computer implemented method of claim 1, the adjusting further comprising:
ascertaining that the user perception is boredom based on discovering that the difficulty corresponding to the item from the identifying is less than the skill level of the user; and
increasing the difficulty corresponding to the item in the interaction during the adjusting to thereby improve the user perception on the interaction.

11. The computer implemented method of claim 1, further comprising:
training the cognitive model of user perception by machine learning with a new user experience input subsequent to the adjusting, wherein the interactive environment is an online game platform, and wherein the interaction is a computer game.

12. A computer program product comprising:
a computer readable storage medium readable by one or more processor and storing instructions for execution by the one or more processor for performing a method comprising:
obtaining a user experience input as being generated by a user during a session of an interaction, wherein an interactive environment services the interaction;
determining a user perception on the interaction based on analyzing the user experience input by use of a cognitive model of user perception;
ascertaining that the user perception is negative on the interaction based on that the user experience input fits activity data associated with a negative review in the cognitive model with respect to one or more difficulty of respective items in the interaction; and
adjusting the one or more difficulty of respective items in the interaction to match a skill level of the user, the adjusting comprising:
identifying an item from the respective items in the interaction, wherein the item is associated with the user experience input that leads to the user perception of the interaction being negative in the ascertaining, wherein a difficulty of the item in the interaction is determined by aspects configuring the item in the interaction, comprising a number and a size of the item, and physical attributes on movement and behavior of the item in the interaction, and wherein the skill level of the user is determined by past and current activity data represented in the cognitive model comprising a current level in the interaction, a number of attempts by the user until completing respective items, and types of acrobatic maneuvers or secrets used by the user respective to the items.

13. The computer program product of claim 12, further comprising:
building the cognitive model of user perception, the cognitive model of user perception including a collection of statistical distributions, wherein each distribution from the collection in the cognitive model of user perception represents how data points of a parameter of one or more parameters in the user experience input are related with positive user perception on the interaction.

14. The computer program product of claim 12, further comprising:
building the cognitive model of user perception, the cognitive model of user perception including a collection of statistical distributions, wherein each distribution from the collection in the cognitive model of user perception represents how data points of a parameter of one or more parameters in the user experience input are related with positive user perception on the interaction, wherein the one or more parameters represented in the user experience input comprise a time period of the session, a set of time periods to complete respective observation units from the interaction, another set of time periods taken to complete respective levels in the interaction, numbers of attempts until to pass respective challenges, types of skills applied by the user, an assessed skill level of the user, points of failure per observation unit period of time, and points of success per the observation unit period of time.

15. The computer program product of claim 12, further comprising:
building the cognitive model of user perception, the cognitive model of user perception including a collection of statistical distributions, wherein each distribution from the collection in the cognitive model of user perception represents how data points of a parameter of one or more parameters in the user experience input are related with positive user perception on the interaction, the building comprising:
obtaining the user experience input including user profile of the user, activity data, and one or more user feedback;
ascertaining that the one or more user feedback is positive; and
adding the data points from the activity data in respective statistical distributions in the cognitive model of user perception.

16. The computer program product of claim 12, further comprising:
training of the cognitive model of user perception by machine learning with a new user experience input subsequent to the adjusting, wherein the interactive environment is an online game platform, and wherein the interaction is a computer game.

17. A system comprising:
a memory;
one or more processor in communication with the memory; and
program instructions executable by the one or more processor via the memory to perform a method comprising:
obtaining a user experience input as being generated by a user during a session of an interaction, wherein an interactive environment services the interaction;
determining a user perception on the interaction based on analyzing the user experience input by use of a cognitive model of user perception;
ascertaining that the user perception is negative on the interaction based on that the user experience input fits activity data associated with a negative review in the cognitive model with respect to one or more difficulty of respective items in the interaction; and adjusting the one or more difficulty of the respective items in the interaction to match a skill level of the user, the adjusting comprising:
identifying an item from the respective items in the interaction, wherein the item is associated with the user experience input that leads to the user perception of the interaction being negative in the ascertaining, wherein a difficulty of the item in the interaction is determined by aspects configuring the item in the interaction, comprising a number and a size of the item, and physical attributes on movement and behavior of the item in the interaction, and wherein the skill level of the user is determined by past and current activity data represented in the cognitive model comprising a current level in the interaction, a number of attempts by the user until completing respective items, and types of acrobatic maneuvers or secrets used by the user respective to the items.

18. The system of claim 17, further comprising:
building the cognitive model of user perception, the cognitive model of user perception including a collection of statistical distributions of data points of activity in the interaction by a plurality of users including the user, wherein each of the statistical distributions from the collection in the cognitive model of user perception represents how the data points of a parameter of one or more parameters in the user experience input are related with positive user perception on the interaction.

19. The system of claim 17, further comprising:
building the cognitive model of user perception, the cognitive model of user perception including a collection of statistical distributions of data points of activity in the interaction by a plurality of users including the user, wherein each of the statistical distributions from the collection in the cognitive model of user perception represents how the data points of a parameter of one or more parameters in the user experience input are related with positive user perception on the interaction;
the ascertaining that the user perception is negative on the interaction comprising:
discovering that, for a data point from the user expedience input, the data point falls outside of a range indicating the positive user perception in a certain statistical distribution of the statistical distributions in the cognitive model of user perception that is applicable to the data point.

20. The system of claim 17, further comprising:
building the cognitive model of user perception, the cognitive model of user perception including a collection of statistical distributions of data points of activity in the interaction by a plurality of users including the user, wherein each of the statistical distributions from the collection in the cognitive model of user perception represents how the data points of a parameter of one or more parameters in the user experience input are related with positive user perception on the interaction, the building comprising:
obtaining the user experience input including user profiles respective to the plurality of users, activity data in the interaction, and one or more user feedback associated with the activity data by the plurality of users, including reviews on the interaction, rankings for the interaction, and chatting messages amongst the plurality of users during the interaction;
ascertaining that the one or more user feedback is positive; and
adding the data points from the activity data to respective statistical distributions in the cognitive model of user perception, wherein the one or more parameters represented in the user experience input comprise a time period of the session, a set of time periods to complete respective observation units from the interaction, another set of time periods taken to complete respective levels in the interaction, numbers of attempts until completing respective challenges, types of skills applied by the user, an assessed skill level of the user, points of failure per the observation unit period of time, and points of success per the observation unit period of time, respective to each of the plurality of the users per session of the interaction.

* * * * *